United States Patent
Nguyen et al.

(10) Patent No.: US 9,767,385 B2
(45) Date of Patent: Sep. 19, 2017

(54) MULTI-LAYER AGGREGATION FOR OBJECT DETECTION

(71) Applicant: SIEMENS HEALTHCARE GMBH, Erlangen (DE)

(72) Inventors: Hien Nguyen, Bensalem, PA (US); Vivek Kumar Singh, Monmouth Junction, NJ (US); Yefeng Zheng, Dayton, NJ (US); Bogdan Georgescu, Plainsboro, NJ (US); Dorin Comaniciu, Princeton Junction, NJ (US); Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 146 days.

(21) Appl. No.: 14/457,381

(22) Filed: Aug. 12, 2014

(65) Prior Publication Data
US 2016/0048741 A1 Feb. 18, 2016

(51) Int. Cl.
*G06K 9/62* (2006.01)
*G06K 9/00* (2006.01)
*G06K 9/46* (2006.01)

(52) U.S. Cl.
CPC ....... *G06K 9/6256* (2013.01); *G06K 9/00624* (2013.01); *G06K 9/00771* (2013.01); *G06K 9/4628* (2013.01); *G06K 9/6255* (2013.01)

(58) Field of Classification Search
CPC .......... G06K 9/6256; G06K 9/00771; G06K 9/4628; G06K 9/6255; G06K 9/00624
See application file for complete search history.

(56) References Cited

U.S. PATENT DOCUMENTS

| | | | |
|---|---|---|---|
| 6,141,437 A * | 10/2000 | Xu | G06T 7/0012 128/922 |
| 2003/0023386 A1 * | 1/2003 | Aranibar | G01N 33/5091 702/19 |
| 2005/0090911 A1 * | 4/2005 | Ingargiola | G06Q 40/00 700/36 |
| 2005/0100208 A1 * | 5/2005 | Suzuki | G06T 5/007 382/157 |
| 2000/9204558 | 8/2009 | Weston et al. | |
| 2009/0274434 A1 * | 11/2009 | Mei | G06K 9/00711 386/278 |
| 2011/0119215 A1 * | 5/2011 | Elmegreen | G06N 3/063 706/37 |
| 2013/0343642 A1 | 12/2013 | Kuo et al. | |

OTHER PUBLICATIONS

International Search Report for PCT/US2015/043057 dated Oct. 12, 2015.

(Continued)

*Primary Examiner* — Stephen R Koziol
*Assistant Examiner* — Elisa Rice

(57) ABSTRACT

Object detection uses a deep or multiple layer network to learn features for detecting the object in the image. Multiple features from different layers are aggregated to train a classifier for the object. In addition or as an alternative to feature aggregation from different layers, an initial layer may have separate learnt nodes for different regions of the image to reduce the number of free parameters. The object detection is learned or a learned object detector is applied.

15 Claims, 3 Drawing Sheets

(56) References Cited

OTHER PUBLICATIONS

Li et al., DeepReID: Deep Filter Pairing Neural Network for Person Re-identification, pp. 152-159, (2014).
Hinton et al., A Fast Learning Algorithm for Deep Belief Nets, Neural Computation, 18:7, 1527-1554, (2006).
Sermanet, P., et al., "Traffic Sign Recognition with Multi-Scale Convolutional Networks," The 2011 International Joint Conference on Neural Networks, Courant Institute of Mathematical Sciences, New York University, pp. 2809-2813, 2011.

* cited by examiner

MULTI-LAYER AGGREGATION FOR OBJECT DETECTION

BACKGROUND

The present embodiments relate to object detection and machine learning of the object detection.

For machine-learnt object detection, input features from the image are used to train and apply the detector. The quality of the feature is crucial to the performance of many image analysis tasks. Various features have been proposed by scientists with a deep understanding of the data and the tasks at hand. For example, Haar features are used in organ detection and segmentation due to their inexpensive computation. Local Binary Pattern (LBP) features are good for representing shape or texture and suitable for human re-identification. None of the features is optimal for all tasks or all types of data. It often requires significant experience to select a good feature for a particular application.

The evolution of sensing technology or variance in existing sensing technology occasionally necessitates the design of a new feature. This process is often challenging since the underlying physics of data generation might not be easy to understand. Dictionary learning and sparse coding algorithms have been used to learn features. For example, the dictionary learning and sparse coding algorithms learn Gabor-like patterns when applied to natural images. However, this approach may produce unstable features due to the high coherence of dictionary atoms. In other words, if there are multiple dictionary atoms that look alike, sparse codes may jump between any of these atoms. Although this is not an issue for image reconstruction or image denoising applications, the instability of features may pose a serious challenge for learning a good classifier or detector.

Another approach to learn features with a machine uses an auto-encoder (AE) or a restricted Boltzmann machine (RBM). Stable features are produced since the decoding step only involves matrix multiplications. In addition, AE or RBM are often stacked to create a deep network of multiple layers. This hierarchical structure may capture more abstract features at the later layers. The output from the last layer of the deep network is used as a learned feature. Although the network may be fine-tuned using discriminative training, the output may not capture all relevant information. This can be caused by the lack of labelled samples or the back-propagation optimization stuck in a bad local minima. In addition, the fully connected structure of the deep network makes it difficult to learn with large images or volumes. For example, a network would have about 30 million free parameters when learning 1000 features from color images of 100×100 pixels.

SUMMARY

Systems, methods, and computer readable media are provided for object detection. The object detection uses a deep or multiple layer network to learn features for detecting the object in the image. Multiple features from different layers are aggregated and used to train a classifier for the object. In addition or as an alternative to feature aggregation from different layers, an initial layer may have separate nodes for different regions of the image to reduce the number of free parameters. The object detection is learned, or a learned object detector is applied.

In a first aspect, a method is provided for object detection. Images of an object are obtained. A plurality of sequential feature layers of a multi-layer feature learning network is defined. An aggregator layer receiving features from multiple layers of the network is provided. A processor jointly optimizes the multi-layer feature learning network and the aggregator layer using the images of the object. The processor outputs a set of learned features represented by the optimized multi-layer feature learning network and a detector which makes use of generated features by the aggregator layer to detect the object. The set of learned features is for distinguishing the object, and the detector is for classifying the object.

In a second aspect, a non-transitory computer readable storage medium has stored therein data representing instructions executable by a programmed processor for object detection. The storage medium includes instructions for: receiving an image of an object; detecting, by the processor, the object in the image with features generated from the hidden layers of a deep network, the hidden features learned from different layers of abstraction which are aggregated and fed into a machine-learnt classifier, by a machine, of the hidden features from the different layers input as a feature vector; and outputting detection of the object.

In a third aspect, a method is provided for object detection. Images of an object are divided into local parts. A machine trains first blocks of feature nodes to reconstruct the local parts of the images. The machine trains second blocks of second attribute nodes to reconstruct the feature nodes. The machine also trains third blocks of third attribute nodes to reconstruct the second attribute nodes. The machine trains a feature aggregator to classify the object. The feature aggregator is trained with the second and third attribute nodes as inputs.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

The quality of a feature or features is important to many image analysis tasks. Useful features may be constructed from raw data using machine learning. The involvement of the machine may better distinguish or identify the useful features as compared to a human. Given the large amount of possible features for images and the variety of sources of images, the machine learning approach is more robust than manual programming. Machine learning distinguishing features may be applied for various products relying on image analysis, such as person re-identification or organ detection. Object detection, whether an organ, person re-identification, or other object, is provided by learning distinguishing features and training a classifier with a machine.

A deep network framework is provided for constructing features from raw image data. Rather than using only pre-programmed features, such as extracted Haar wavelets, hue saturation value (HSV) histogram, or local binary patterns (LBP), the deep network framework is used to learn features for detection, such as detection for recognition or re-identification. For example, in detection, local features for object's parts detection are learned in the first layer. The local features may be used to quickly get rid of a large number of easy candidates not of the object or object characteristic of interest. More difficult candidates may be pruned using more abstract features learned in the later layers of the deep network. The learning process is performed with the deep network having any number of layers or depth. At the end, all or some of the features from more than one layer, such as two or more intermediate layers, are aggregated and fed directly into a classifier for the final prediction. The classifier is optimized jointly with the other layers of the deep network as part of the machine learning. This aggregation, local-to-global network structure, or both may provide more efficient and/or less error prone detection as compared to machine training with pre-programmed features and/or as compared to learning features with a deep network without aggregation or without local-to-global layers.

Figure 1:
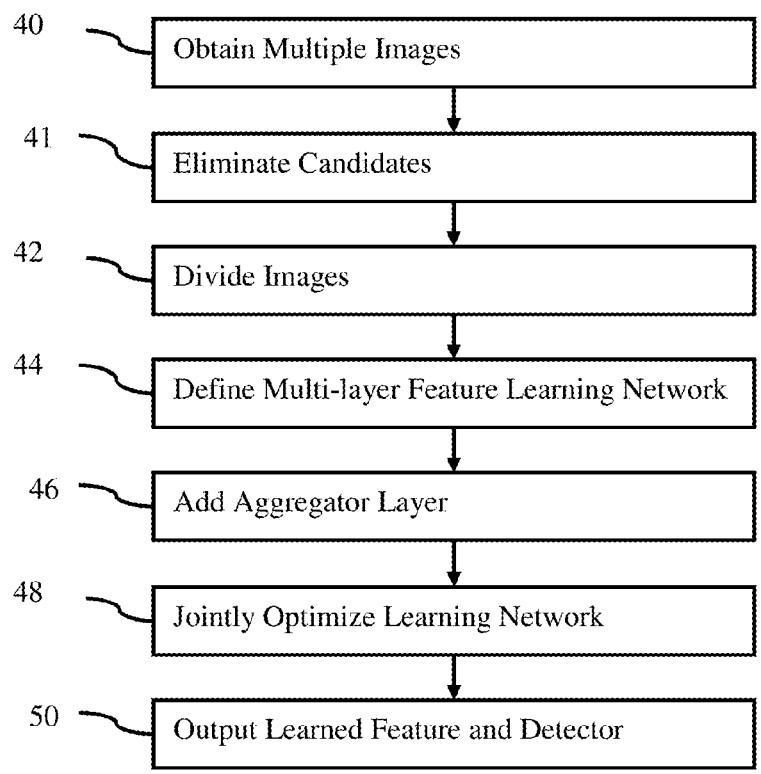
FIG. 1 is a flow chart diagram of one embodiment of a method for object detection training.
Figure 4:
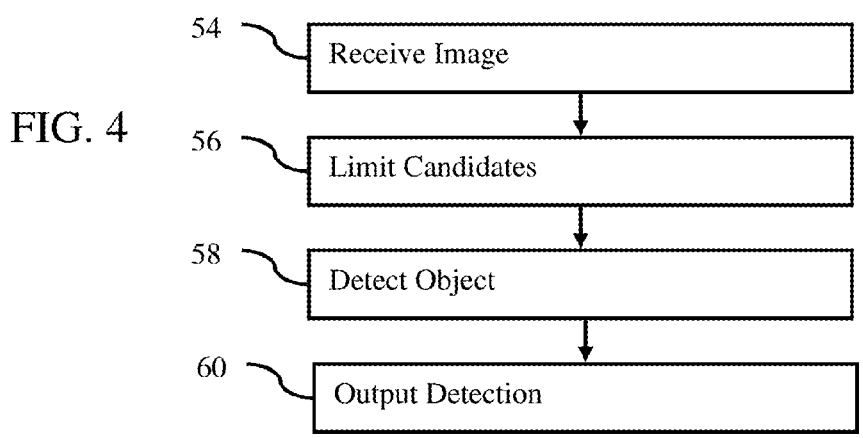
FIG. 4 is a flow chart diagram of one embodiment of a method for object detection application.

FIGS. 1 and 4 show methods for object detection. The detection of an object may be detection of an attribute or distinguishing characteristic of the object. Parts or the overall object may be detected. The method for object detection may be a method to learn how to detect the object or may be a method for detecting the object. FIG. 1 is directed to machine training of the object detector. FIG. 4 is directed to application of a machine-learnt object detector. In both cases, a machine, such as a processor, computer, or server, implements some or all of the acts. The system of FIG. 6 implements the methods in one embodiment. A user may select the image files for application of the object detector by the processor or select the image from which to learn features and a classifier by a processor. Use of the machine allows processing large volumes (e.g., images of many pixels and/or many images) of information that may not be efficiently handled by humans, may be unrealistically handled by humans in the needed time frame, or may not even be possible by humans due to subtleties and/or timing.

The methods are provided in the orders shown, but other orders may be provided. For FIG. 1, acts 44 and 46 may be performed as one act defining the deep network with an aggregator layer for the classifier.

Additional, different or fewer acts may be provided. For example, acts 41 and/or 42 of FIG. 1 are not provided. As another example, act 56 of FIG. 4 is not provided. In both these examples, aggregation of features from different layers directly into the classifier is used without separate feature learning for different parts of an image. In yet other examples, acts for capturing images and/or acts using detected information are provided.

FIG. 1 shows a method for object detection in learning, by a processor, a feature or features that distinguish the object or object characteristic. The feature may be used by the processor to classify the object or image and/or by the processor to train a classifier.

In act 40, one or more images of an object are obtained. The images are obtained by data transfer, capture, and/or loading from memory. Any number of pictures of a same object is obtained, such as one, two, tens or hundreds of images of the object. The images are of the object with a same sensor or different sensors. The object in one perspective or from many perspectives may be included in the images.

The images may be of any object, such as an organ, a person, or a building, or a plurality of objects (e.g., a crowd of people or multiple organs). The same object is used in the positive match ground truth images. Alternatively, many different objects are used in the positive match ground truth images where the features are trained to distinguish attributes or people in general.

The images are captured using any one or more sensors. For example, images of organs are captured using x-ray, computer tomography, fluoroscopy, angiography, magnetic resonance, ultrasound, positron emission tomography, or single photon emission computed tomography. Multiple images of the same or different patients using the same or different imaging modality (i.e., sensors or type of sensor) in the same or different settings (e.g., field of view) may be obtained. The object of interest in a medical image may be an organ, a cyst, a tumor, calcification or other anomaly.

In one embodiment, the images are security or area monitoring images where the object is a person or people. The images are obtained from cameras or other video devices. Images may be obtained in various manners, such as transfer over a wired or wireless network, loading from memory, direct feed, or other access to the images.

The images are from different cameras and/or a same camera at different times. The obtained images represent one or more people in a field of view of the respective camera. As a person traverses through a video surveyed region, typically along a common travel path, different cameras or the same camera at a different times capture the same person.

The images are generally from a same period, such as within minutes or hours of each other. The period covers a time in which a person is likely wearing the same clothing and/or in which the person is within the surveyed region. Longer or shorter periods may be used, such as re-identifying a same person that has returned to a surveyed region hours, days, or weeks later.

The images may or may not be of a same person. For example, an airport video surveillance system may capture images of hundreds or thousands of different people. One image may include no, one, or many people. One of the many people may be a same person as was captured in a different image, or none of the many people in an image may be the same person. For training, the images with and without and which of the people in a given image belong to the same person are known and used as ground truth.

The images may be of a region or may be cropped. For re-identification or matching, a rectangular box fit to just surround a person in any image may be used. Each such box may be used as an image so that a picture with many people may be used as many images. Any people in the image of the region are cropped so that the resulting person image represents, at least mostly, just one person. An outline cropping may be used, such as where the general border of a person or the specific person is detected and cropped.

Other image processing to the image of the region and/or to images of individuals may be used, such as low pass, high pass, band pass, directional, or other filtering.

Figure 2:
FIG. 2 shows example images for re-identification using machine-learnt object detection.

FIG. 2 shows example images to be used in training for re-identification. The left images of the two rows show two people to be re-identified in other images. The right sets of images show six possible candidates for the re-identification. For training, it is known that the first image of the candidates is a match while the other five are not. A greater number of matches and/or non-matches may be used.

The task of person re-identification is to determine whether a given subject has already appeared over a network of cameras, and retrieve relevant images of this subject if he or she did. This problem is difficult due to the change of viewpoint, illumination, and resolution across cameras. In previous approaches, person re-identification systems often contain two steps. The first step is feature extraction, such as extracting HSV histogram and LBP features. The second step learns a ranking function, such as training a classifier using the ground truth and the HSV and LBP features as inputs.

The learnt features from the deep network may be combined with other hand-designed features (e.g., pre-programmed or manually designated) to improve the performance. For instance, 3D Haar features are employed to quickly eliminate easy candidates in an organ detection task. The features learnt from the deep network may be used in the subsequent stage to prune difficult candidates that were not able to detect by Haar features. This hybrid approach may improve both speed and accuracy of the detection algorithm.

Using a deep network may be relatively processing intensive as compared to the traditional approach. To reduce the processing, the traditional approach may be combined with the deep network approach used below for acts 42-48. In act 41, candidates for matching of the object are eliminated with pre-programmed features. For example, HSV histogram and/or LBP and corresponding classifiers are used to exclude one or more images as not a match. In the top row example of FIG. 2, the third, fifth, and sixth images of the top row may be determined to not be matches using a machine trained classifier with pre-programmed features. In the bottom row example of FIG. 2, the third image of the bottom row may be determined to not be a match using a machine trained classifier with pre-programmed features. In other examples, the candidates are all in a same image. In a medical environment, Haar wavelet features may be used to identify regions of an image that are not the object.

As a result of the elimination, the deep network has fewer candidates to apply. In the context of training, the traditional approaches may be used to reduce the training data or images. The deep network is trained using images that would pass through or not be eliminated by another approach. The optimization of act 48 uses the remaining candidates after the elimination.

The elimination may be built into the deep network. Features from the early layers, such as an initial layer, are used to prune candidates so that the later or deeper layers are not burdened with processing for those candidates. The features of earlier layers may be faster to compute for quickly pruning easy candidates in the detection problem.

In act 42, each of the images is divided into sub-regions. Any size, shape, and/or number of sub-regions may be used. The sub-regions of a given image are of a same size and shape, or may have different sizes and shapes. For example, the center (e.g., in medical) or other part (e.g., upper center of cropped image of a person) of an image may more likely include the object or part of the object of interest, so smaller or larger sub-regions are formed at that part of the image. The sub-regions are mutually exclusive, but some overlap may be provided.

Figure 3:
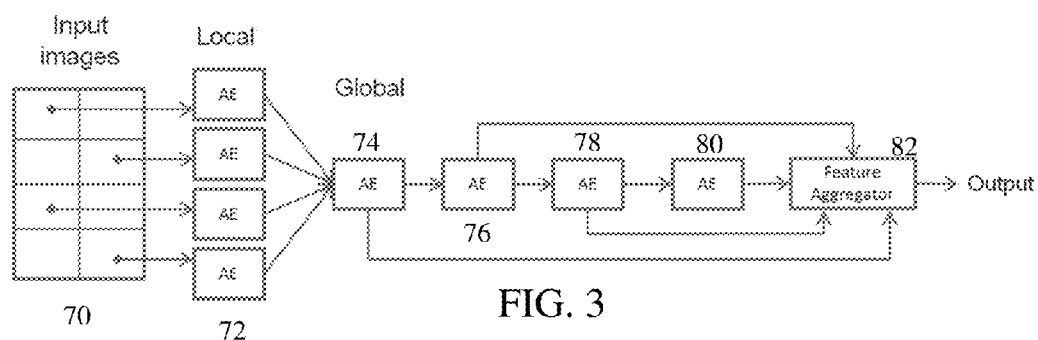
FIG. 3 illustrates an example configuration of a deep network with separate learnt features for local parts of the image and a feature aggregator from multiple layers.

FIG. 3 shows one example of dividing an image 70. A given image is divided into six rectangular local parts. Local is used to indicate less than all or not global. The local parts are to be handled separately. At least some features are learnt for each local part independent of information from other local parts. In alternative embodiments, the image is not divided. Instead, the image is used as a whole or the features are learnt from the global image.

In act 44, the deep network is defined. The definition is by configuration or programming of the learning. The number of layers, type of learning, and other characteristics of the network are controlled by the programmer or user. In other embodiments, one or more aspects (e.g., number of nodes, number of layers, or type of learning) are defined and selected by the machine during the learning. In the example of FIG. 3, the deep architecture has five layers, not including the aggregator. Any number of layers may be provided, such as two, three, four or more.

The multi-layer feature learning network is defined as a plurality of sequential feature layers. Sequential is used to indicate the general flow of visible image as input to a next layer, where the information from the next layer is fed to a next layer, and so on until output. For example in FIG. 3, the outputs from the first sequential feature layer 72 are features fed to the second sequential feature layer 74, the outputs from the second sequential feature layer 74 are second features fed to the third sequential feature layer 76, the outputs of the third sequential feature layer 76 are third features fed to the fourth sequential feature layer 78, and the outputs of the fourth sequential feature layer 78 are fourth features fed to the fifth sequential feature layer 80. This process continues until the network reaches a desirable depth. The number of layers defined may be based on trial and error.

The layers may only feed forward or may be bi-direction, including some feedback to a previous layer. The nodes of each layer may connect with all or only a sub-set of nodes of a previous layer or subsequent layer.

Within a layer 72-80, any number of nodes is provided. For example, 100 nodes are provided. A different number of nodes may be provided for different layers 72-80, such as 10 nodes in each of the blocks of layer 72, 100 nodes for layers 74 and 76, and fewer nodes for layers 78 and 80. Later or subsequent layers may have more, fewer, or the same number of nodes. In general, subsequent layers have more abstraction. For example, the first layer provides features from the image, such as one node or feature being a line found in the image. The next layer combines lines, so that one of the nodes is a corner. The next layer may combine features (e.g., the corner and length of lines) from a previous layer so that the node provides a shape or building indication.

In the re-identification example, instead of finding a ranking function directly from the low-level features, the low-level features are used to predict higher-level or more abstract features called "attributes." Examples of attributes are hair color, shirt color, gender, pants, dress, bag, or others. The predicted attribute labels are used to retrieve relevant instances of the subject. For example, "find a person with blond hair and dark shirt." Attributes may lead to a better performance and a more intuitive retrieval system to which a human may provide direct input or queries. Attributes, as features, are abstract, and it may not be clear what low-level feature (e.g., HSV color histogram or LBP) is relevant for an attribute like gender.

Rather than pre-programming the features and trying to relate the features to attributes, the deep architecture is defined to learn the features at different levels of abstraction. The features are learned to reconstruct lower level features. For example, features for reconstructing an image are learned. For a next layer, features for reconstructing the features of the previous layer are learned, providing more abstraction.

Deep architectures include convolutional neural network (CNN) or deep belief nets (DBN), but other deep networks may be used. CNN learns feed-forward mapping functions while DBN learns a generative model of data. In addition, CNN uses shared weights for all local regions while DBN is a fully connected network (i.e., having different weights for all regions of an image). The training of CNN is entirely discriminative through back-propagation. DBN, on the other hand, employs the layer-wise unsupervised training (e.g., pre-training) followed by the discriminative refinement with back-propagation if necessary.

Each node of the layer represents a feature. Different nodes are provided for learning different features. Any number of nodes may be used. In the example of FIG. 3, each box or layer 72-80 generically represents a plurality of nodes.

The features of the nodes are learned by the machine using any building blocks. For example, auto-encoder (AE) or restricted Boltzmann machine (RBM) approaches are used. FIG. 3 shows use of AE for each layer 72-80. AE transforms data linearly, and then applies a non-linear rectification, like a sigmoid function. The objective function of AE is the expected mean square error between the input image and reconstructed images using the learned features. AE may be trained using stochastic gradient descent or other approach to learn, by a machine, the features leading to the best reconstruction.

The objective function of RBM is an energy function. Exact computation of the likelihood term associated with RBM is intractable. Therefore, approximate algorithm, such as contrastive-divergence based on k-step Gibb sampling or other, is used to train the RBM to reconstruct the image from features.

Training of AE or RBM is prone to over-fitting for high-dimensional input data. Sparsity or denoising techniques (e.g., sparse denoising AE (SDAE)) are employed to constrain the freedom of parameters and force learning of interesting structures within the data. Adding noise to training images and requiring the network to reconstruct noise-free images may prevent over-fitting. Enforcing sparsity within hidden layers (i.e., only a small number of units in hidden layers are activated at one time) may also regularize the network.

FIG. 3 shows one example definition of a network architecture of multi-layer feature learning and aggregation. In this example, the framework of the network is a deep architecture for automatically constructing useful features from raw input images. The network uses a local-to-global approach where the initial layer 72 has separate blocks for independently learning features for local regions and later layers 74-80 globally operate on the features for the entire image 70. The first sequential feature layer 72 is defined as separate local feature learners (e.g., blocks of AE) for respective sub-regions of the image 70. Six such sub-regions and corresponding six separately learned or trained sets of nodes or features in the layer 72 are provided. For example, the images are divided into multiple 16×16 pixels patches. The spatial division helps reduce the computational burden in learning with big images. For example, the number of free variable decreases by more than 10 times comparing to a fully connected network (i.e., first layer being global). A sparse denoising auto-encoder (SDAE) (i.e., auto-encoder with sparsity and denoising regularizers), with m hidden units or nodes (e.g. m=100) is learned to reconstruct well each region. Different filters are learned for the different local regions. Other numbers of sub-regions and hidden nodes may be used.

Any number of layers using the local division may be provided. FIG. 3 shows just one layer 72 with local feature learning. Other layers, such as the second layer 74, are defined as global feature learners for learning features for the entirety of the images from outputs of the separate local feature learners. For example, the outputs from all the local SDAE of layer 72 are aggregated and fed into an SDAE in the second layer 74. The output from the second layer 74 is fed into another SDAE in the third layer 76. In alternative embodiments, the local-to-global approach is not used.

In act 46 of FIG. 1, an aggregator layer 82 is provided. This aggregator layer is defined as part of the deep network or is treated separately in defining the network. Rather than providing for reconstruction to learn the features, the aggregator layer 82 uses features to classify or detect. The aggregator layer 82 is a classifier terminating the feature learning network. For example, the aggregator layer 82 is a probabilistic boosting tree, support vector machine, or other machine learning classifier. Other classifiers may include a single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. Error-correcting output code (ECOC) may be used.

The aggregator layer 82 receives features from nodes of multiple of the feature layers. Rather than working with the features of the most abstract layer 80, the input vector of the aggregator layer 82 includes all or some features directly from multiple different layers 74-80 and corresponding levels of abstraction. For example, the features from the last two, three, or four layers are aggregated. In the example of FIG. 3, the aggregator layer 82 receives all of the features or node outputs from the layers 74-80. In alternative embodiments, features from fewer or more layers 72-80 are aggregated. In other alternative embodiments, fewer than all of the features or node outputs from a given layer are used, such as where the feature is not determinative of the class or detection but is used for determining a feature of a subsequent layer.

In act 48 of FIG. 1, the multi-layer feature learning network and the aggregator layer are trained together using the images of the object. Machine learning is performed to train the various layers 72-82 using the defined deep architecture. The features that are determinative or allow reconstruction of inputs are learned. Similarly, the features providing the desired result or classification of the detector implemented by the aggregator layer 82 are learned. The classifier is also learned.

For training to work together, the multi-layer feature learning network and the classifier of the aggregator layer are jointly optimized. The results relative to the ground truth for classification and the error for reconstruction for the feature learning network are back-projected to train which features work best. Using back projection from the aggregator layer 82 to the multiple ones of the feature layers 74-80 and back projection between sequential layers (e.g., 80 to 78, 78 to 76, 76 to 74, and 74 to 72) results in refinement of the learned features or nodes and the classifier relative to the ground truth for the input images 70. In training, the network propagates the gradient from the last layer not only to the previous layer, but also to all intermediate layers connected with the aggregator layer 82, jointly optimizing the entire network. Joint optimization results in the classifier and feature learning network being trained together to best detect the object, such as detecting one or more characteristics of the object.

It is also possible to fine-tune the network using back-propagation together with learning the classifier, such as with learning attribute classifiers. For example, the reconstruction errors are used to back-project for training the features to detect in layers 72-80. The aggregator layer 82 is then trained with or without refinement of the features of the other layers 72-80. The learned features are used to train the classifier or classifiers of the aggregator layer 82.

During the optimization, the different distinguishing features are learned. In the example of FIG. 3, the machine trains blocks of feature nodes to reconstruct the local parts of the images. The machine also trains blocks of attribute nodes to reconstruct the feature nodes and blocks of other attribute nodes to reconstruct the previous attribute nodes. The machine also learns a mapping function of the aggregator layer, such as through training with a probabilistic boosting tree or support vector machine. The feature aggregator is trained to classify the object using the features from multiple other layers as inputs. The training of the mapping function relates all or a subset of the input features for detecting. For example, the aggregator layer learns a mapping function to predict 21 attributes from any combination of features from nodes of multiple layers of the multi-layer feature learning network. The learning may indicate only a sub-set of features from different nodes to be used for classification.

In act 50, a learned feature and a detector are output. The learned feature is represented by the optimized multi-layer feature learning network. The collection of individual features forms a feature or feature set for distinguishing an object from other objects. The features are provided as nodes of the feature layers in different levels of abstraction based on reconstruction of the object from the images. The nodes define processes trained to extract the feature.

The detector is a classifier for classifying the object. Using the output feature, the detector detects a characteristic or attribute of the object. For example in a person re-identification embodiment, the output detector provides labels for 21 attributes. The attributes are features used to detect the match. The labels may be binary (e.g., "yes" or "no" for an attribute) or ranked (e.g., size of 1-10). Alternatively, the detector classifies whether an input person from one image is the same person in another image. The detector may use features from early layers to quickly reject unlikely candidates during the detection process.

Once trained, a matrix is output. The matrix represents the learnt algorithm for the features and the detector. Alternatively, separate matrices are used for any of the nodes, layers, network, and/or detector.

When a new sensor is added to a system, such as a camera to a security or occupant monitoring system, the features to use and detector are trained for use with that camera. When a new type of sensor is developed, the features and detection may be trained from that new type of sensor from the sensor data. In other embodiments, the training is performed for any given matching or detection circumstance. For example in re-identification, one or more images of the person to locate in other images are used to learn the features and train the detector. Other images may then be used to determine a match or not. As a person is to be located, the feature and detector is trained specifically for that person.

Once the feature is learned and the detector is trained, the feature and detector may be applied. The matrix defining the feature or features is used to extract from an input image. The detector uses the extracted features from the image to classify the input image as representing the object or not. The output may be a binary yes/no or a probability of being the same person. The output may be for different attributes rather than match or not. Probabilistic or other information, such as associated with alternative values, may be provided.

FIG. 4 is a flow chart of one embodiment of object detection application. The same processor or a different processor applies the learnt features and detector. For example, the matrix or matrices are transmitted to another processor for that processor to apply.

In act 54, the processor receives one or more images of an object. The images may include the same object or a different object. The application is to determine whether the object or characteristics of the object are the same or not. The image is received as visible information from the sensor. For other types of sensors, the information may be data other than an image.

In act 56, the processor limits candidates with pre-programmed features prior to detecting with hidden features of the deep network. For example, the processor applies one or more classifiers using Haar, HSV color histograms, LBP, gradients, and/or other information to determine whether each image is of the object or not, or to determine whether different parts of an image are of the object or not. The learnt multi-layer network and classifier may then be applied only against remaining candidates (e.g., images and/or parts of an image).

In act 58, whether the input image or part of the image represents the object is detected using the hidden features of the deep network. For example, the trained AE or RBM blocks are applied to the appropriate inputs to extract the corresponding features. The hidden features are the feature nodes learned from the different layers of abstraction in the multi-layer network. Using the learned transforms, non-linear rectification, energy function, or other function, the feature of the input image or images are extracted from the image. Other more abstract features may be extracted from those extracted features using the layer structure. Depending on the number of layers, other features are extracted from features of the previous layer. The features are values, such as binary, integer, or fractional values representing an amount of similarity, such as a probability of being the feature in the object.

In one embodiment, the detection includes using separate hidden features for different sub-parts of the image. The local or sub-region specific features are extracted. Other features (e.g., global features) using the extracted local features may be extracted.

The detection uses the extracted features from different layers as a feature vector or input to the machine-learnt classifier of the aggregator. The hidden features from the different layers are aggregated as the input feature vector to the machine-learnt classifier. The classifier then outputs the detection, such as whether the image is a match, probability of match (e.g., 88% probability that the person has a long sleeve shirt), or other indicator of the object or characteristic of the object.

In act 60, the detection is output. The results or detected information are output. For example, whether there is a match is output. As another example, the probability of match for one or more attributes is output. Any information or classification may be output for the object or parts of the object. For example, the probability of match for many (e.g., 10 or more) attributes is output.

The output is to an image. For example, a ground truth image and the image to which detection are applied are displayed simultaneously. The results of the detection indicate whether there is a match or other detection or not. In the example of FIG. 2, any matching images are highlighted, such as a box put around the images. In other examples, matching attributes are highlighted and/or non-matching attributes are highlighted in a different way.

In one example of training and application for re-identification, use of the local-to-global feature learning and aggregation from features of different layers in the classifier improves attribute classification as compared to a machine-learned approach using HSV color histogram and LBP. The VIPER dataset has 632 subjects, each of which has 2 images from different viewpoints. The network is defined with L layers (e.g. L=5, network size 18432-4800-3000-500-200-42) with 32 local regions in the first layer, 5 SDAE blocks and aggregation from 3 last layers. Using the learned features from the deep network, an accuracy of 34.2% within rank-1 retrieval results compares with 15.2% of the current state of the art which uses a rank boost approach using HSV histogram and LBP. The rank-5 and rank-10 results are 52.1% and 63.3% comparing to 40.6% and 53.3% of the state of the art, respectively.

Figure 5:
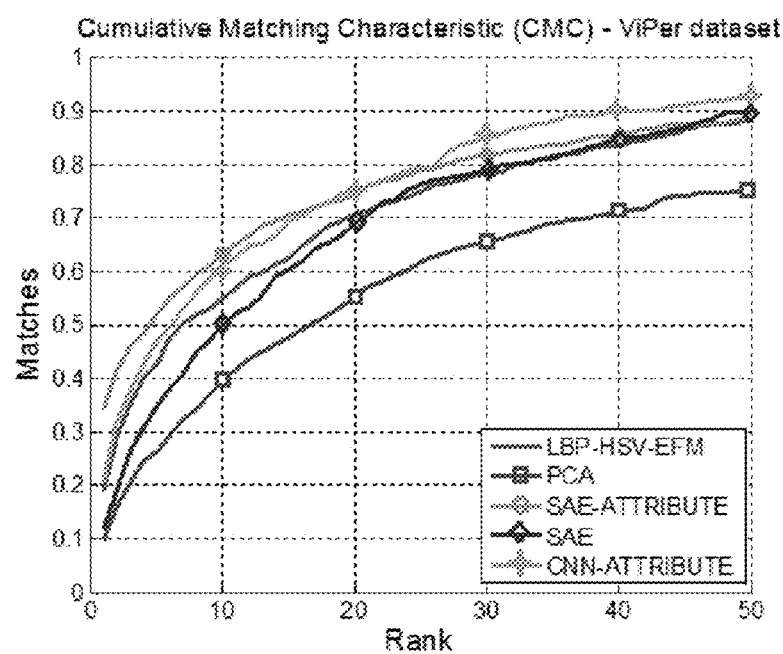
FIG. 5 is a graph showing error rates in cumulative matching characteristic for re-identification using different deep networks.

FIG. 5 shows comparisons of ranking performance for different methods, where SAE-Attribute and CNN-attribute correspond to performances of multi-layer feature aggregation networks whose building blocks are SAE and CNN, which use attribute classification output in addition with intermediate learned features for person identification task. LBP-HSV-EFM is the state of the art method, which uses the rank boost algorithm with a combination of local binary pattern, histogram of color, and explicit feature mapping technique. PCA corresponds to using principal component analysis to produce features in combination with support vector ranking method. SAE is the result for multi-layer feature aggregation network without using attribute classification output for person reidentification.

The same person re-identification experiments may be performed using only the last layer's output as an input feature for the classifier. The accuracies drop to 27.4%, 49.4% and 58.2% for rank-1, rank-5 and rank-10, respectively, as compared to multi-layer feature aggregation. The feature aggregation of intermediate layers may consistently improve the performance.

The SDAE is used in some examples above. The same network definition may be used to construct features from a CNN network of L layers (e.g. L=5, network configuration is 5×5 filter 2×2 pooling 5×5 filter 3×3 pooling 21 outputs). The features from last 3 layers are aggregated. The accuracy may be 20.9%, 46.8% and 61.8% for rank-1, rank-5 and rank-10 results.

In another example, attribute classification using learned features verses HSV and LBP features performs better. For example, the error rates for the local-to-global with layer aggregation in a deep network are 16%, 27%, and 39.5% in comparison with 20.5%, 32.7%, and 46% of the HSV histogram and LBP feature with rank boost method on three attributes "dark-shirt", "dark-bottom" and "male", respectively.

Figure 6:
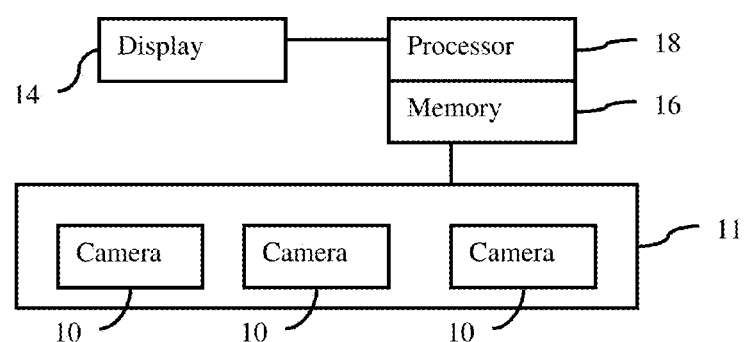
FIG. 6 is a block diagram of one embodiment of a system for object detection.

FIG. 6 shows a system for object detection in person re-identification. The system is a host computer, control station, work station, server, or other arrangement used for person re-identification. The system includes the display 14, memory 16, and processor 18. Additional, different, or fewer components may be provided. The system is for training, such as using images from the surveillance system 11 as ground truth. Alternatively, the system is for application of the learned features and classifier. In other embodiments, the surveillance system 11 and cameras 10 are replaced by medical imagers or other sensors.

The display 14, processor 18, and memory 16 may be part of a computer, server, or other system for image processing images from cameras 10 of the video surveillance system 11. A workstation or control station for the system 11 may be used. Alternatively, a separate or remote device not part of the video surveillance system 11 is used. Instead, the re-identification is performed remotely.

In one embodiment, the processor 18 and memory 16 are part of a server hosting the re-identification function for use by the surveillance system 11 as the client. The client and server are interconnected by a network, such as an intranet or the Internet. The client may be a computer of the video surveillance system 11, and the server may be provided by a manufacturer, provider, host, or creator of the video surveillance system 11.

The video surveillance system 11 includes a plurality of cameras 10. The cameras are distributed throughout a region, such as building, floor of a building, warehouse, campus, complex, outdoor region, arena, airport, transportation region, hub, city, or tunnel system. The cameras 10 are installed and connected to a communications network. Each camera 10 captures a scene of an area. The video cameras 10 may observe the Open Network Video Interface Forum (ONVIF) specification. The camera video streams are coupled to a video processing unit, which is coupled to a video store and to a video content analytics (VCA) module. The VCA module outputs time-stamped video data and metadata to their respective stores. The VCA module generates and outputs metadata in accordance with algorithms. The video and metadata stores may be implemented as digital video recorders (DVRs) or network video recorders (NVRs) for storage and replay. Video data is encoded and stored. The stream-based metadata may be stored with video. Other arrangements for video surveillance may be provided, such as regular capture of still images rather than video.

The display 14 is a CRT, LCD, projector, plasma, printer, smart phone or other now known or later developed display device for displaying the images, attributes, re-identification and/or object detection information. For example, the display 14 displays two images, information about the camera locations for the images, and an indication of whether the same person is in both images. The display 14 assists in confirming matches or re-identification. Attribute information may be displayed instead or additionally. In a training environment, the display may be of the network definition, feature information, back-projection information, joint optimization information, or other training information.

The instructions, network definition, features, classifiers, matrices, outputs, and/or other information are stored in a non-transitory computer readable memory, such as the memory 16. The memory 16 is an external storage device, RAM, ROM, database, and/or a local memory (e.g., solid state drive or hard drive). The same or different non-transitory computer readable media may be used for the instructions and other data. The memory 16 may be implemented using a database management system (DBMS) managed by the processor 18 and residing on a memory, such as a hard disk, RAM, or removable media. Alternatively, the memory 16 is internal to the processor 18 (e.g. cache).

The instructions for implementing the object detection in training or application processes, methods and/or techniques discussed herein are provided on non-transitory computer-readable storage media or memories, such as a cache, buffer, RAM, removable media, hard drive or other computer readable storage media (e.g., the memory 16). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

A program may be uploaded to, and executed by, the processor 18 comprising any suitable architecture. Likewise, processing strategies may include multiprocessing, multitasking, parallel processing and the like. The processor 18 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 18 is one or more processors in a network.

The processor 18 is configured to obtain images. The images may be of a field of view or of a person clipped from the field of view. The processor 18 may perform the clipping. Regions or division of the image may be delineated by the processor 18.

The processor 18 is configured to learn features or extract learned features. For example, a multi-layer feature learning network is defined and used to learn features to re-identify a person. The features are learned at different layers. In one embodiment, local and global features are learned. The learnt features may be extracted by application of the learnt process.

The processor 18 is configured to classify based on the learned features. The features are input to learn to classify the input images. Using ground truth and joint optimization, the classifier is learned with learning the features. For application, the processor 18 determines an output of the machine-learnt classifier based on the input learned features.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for object detection, the method comprising:
obtaining images of an object;
defining an input layer and a plurality of sequential feature layers subsequent to the input layer of a multi-layer feature learning network, features from the input layer provided directly to a first of the sequential feature layers, features from each of the sequential feature layers provided directly to a next of the sequential feature layers, the sequential feature layers comprising hidden layers;
providing an aggregator layer receiving the features directly from multiple layers of the sequential feature layers of the multi-layer feature learning network, the features from different ones of the sequential feature layers provided to subsequent ones of the sequential feature layers and also provided directly to the aggregator layer without processing by the subsequent ones, the aggregator layer aggregating the received features;
optimizing, jointly and by a processor, the multi-layer feature learning network and the aggregator layer using the images of the object; and
outputting, by the processor, a set of learned features represented by the optimized multi-layer feature learning network and a detector that makes use of the generated features by the optimized aggregator layer, the set of learned features being for distinguishing the object and the detector being for classifying the object.

2. The method of claim 1 wherein obtaining the images comprises obtaining medical images with the object comprising an organ or medical anomaly.

3. The method of claim 1 wherein obtaining the images comprises obtaining security images with the object comprising a person.

4. The method of claim 1 wherein defining comprises defining the multi-layer feature learning network as a deep architecture.

5. The method of claim 1 wherein defining comprises defining the sequential feature layers as auto-encoder layers.

6. The method of claim 1 wherein defining comprises defining the sequential feature layers as restricted Boltzmann machine layers.

7. The method of claim 1 wherein defining comprises defining the multi-layer feature learning network as having at least four of the sequential feature layers, outputs from a first of the sequential feature layers being first features fed to a second of the sequential feature layers, outputs from the second of the sequential feature layers being second features fed to a third of the sequential feature layers, outputs of the third of the sequential feature layers being third features fed to a fourth of the sequential feature layers, and outputs of the fourth, third, and second of the sequential feature layers being fed directly to the aggregator layer.

8. The method of claim 1 wherein optimizing comprises machine learning.

9. The method of claim 1 wherein optimizing jointly comprises using back projection between adjacent ones of the sequential feature layers and from the aggregator layer to the multiple ones of the sequential feature layers.

10. The method of claim 1 wherein optimizing comprises learning a mapping function of the aggregator layer with a probabilistic boosting tree or support vector machine.

11. The method of claim 1 wherein outputting the detector comprises outputting the detector as a classifier of a plurality of attributes based on the features of the multiple feature layers.

12. The method of claim 1 wherein outputting the learned feature comprises outputting the features of the separate feature layers as different levels of abstraction based on reconstruction of the object.

13. The method of claim 1 further comprising dividing each of the images into sub-regions, wherein defining comprises defining a first of the sequential feature layers into separate local feature learners for respective sub-regions and defining a second of the sequential feature layers as a global feature learner for the entirety of the images from outputs of the separate local feature learners.

14. The method of claim 1 further comprising eliminating candidates for the object with pre-programmed features, and wherein optimizing comprises optimizing using remaining candidates after the eliminating.

15. A method for object detection, the method comprising:

obtaining images of an object;

defining a plurality of sequential feature layers of a multi-layer feature learning network;

providing an aggregator layer receiving features from multiple layers of the multi-layer feature learning network;

optimizing, jointly and by a processor, the multi-layer feature learning network and the aggregator layer using the images of the object, the optimizing jointly using back projection between adjacent ones of the sequential feature layers and from the aggregator layer to the multiple ones of the sequential feature layers; and outputting, by the processor, a set of learned features represented by the optimized multi-layer feature learning network and a detector that makes use of the generated features by the optimized aggregator layer, the set of learned features being for distinguishing the object and the detector being for classifying the object.

* * * * *